Patented Aug. 16, 1938

2,126,958

UNITED STATES PATENT OFFICE 2,126,958

PROCESS FOR PRESERVING FRESH FRUITS

Jatindra N. Guha, Los Angeles, Calif., assignor to Hazara S. Hateshi, Los Angeles, Calif.

No Drawing. Application May 4, 1935, Serial No. 19,904

6 Claims. (Cl. 99—154)

The fruit growing industries have been faced for years with the problem of maintaining the fruit in healthy condition during shipping and storage periods. Citrus fruits and deciduous fruits are particularly susceptible to attack and decay caused by molds of the Penicillium and Aspergillus types.

Various attempts have been made in the past to reduce such decay by passing fruits through solutions of borax and hypochlorite but none of these methods have helped more than but partially protecting fruits against decay producing fungi.

In the customary method of handling citrus fruits, the fruit is first washed thru a solution of soap and other cleaning agents; then it is brought in contact with a treating solution such as 6% borax at a temperature of 120° F. for a period of 5 minutes. It is later taken out, dried and waxed. The use of borax at such a dangerously high temperature is only effective against green mold but has no appreciable effect on the blue mold (see Journal of Agricultural Research U. S. D. A. vol. 30, p. 189, 1925). Such a prolonged contact at as high a temperature as 120° injures the fruit in that the essential oils and waxes are bleached out of the peel and the fruit withers very rapidly. Furthermore, the Valencia oranges have a very thin and tender skin and contact of fruit at 120° for 5 minute period expands the orange and the skin ruptures and in this way a loss as high as 10% of the oranges results.

Hypochlorite, on the other hand, has a detrimental effect on the bristles of brushes used for washing fruit and also attacks the metal parts of the machinery used in handling the fruit. Furthermore, the use of hypochlorite solution has not given very satisfactory results. In order to obviate these troubles, a new and improved method of sterilizing fruit has recently been introduced in the commercial fruit packing houses. This method uses nitrogen trichloride gas. This gas is brought in contact with the fruit for a perod of 5 or 6 hrs. and then the fruit is taken out, washed and packed. The method seems to have shown good possibilities. There are however very serious objections to the use of this gas as it is well known to be one of the most explosive gases known. It is manufactured right in each packing house when needed for use and requires elaborate machinery for its manufacture. It therefore requires the services of a trained and expert chemist in each packing house. Aside from the dangerously explosive character of the nitrogen trichloride, it runs up the cost of operation enormously and the price becomes almost prohibitive. Various attempts have been made to use chlorine gas and bring the fruit in contact with it in an enclosed room (just as nitrogen chloride is used) but the efforts have been fruitless. The amount of chlorine gas used is so small that it has become almost impossible to control it. Larger quantities than the required amount burn the fruit.

The present invention is based upon the discovery that when a measured or predetermined quantity of a hypochlorite solution such as, for example, sodium hypochlorite, is placed in a fruit storage or treating room and a measured or predetermined quantity of an acid such as, for example, hydrochloric acid, is gradually added to the hypochlorite, gaseous products of reaction are generated and released into the fruit treating room. These gaseous products of reaction vapors generated appear to contain chlorine in the form of hypochlorous acid gas and these vapors or gaseous products of reaction are herein referred to as chlorine-containing gases. When fruit or vegetables are permitted to remain in contact with or are subjected to these generated vapors and reaction products for a period of time of say about 2 to 6 hours, the fruit or vegetables are sterilized and the common forms of fungi and decay are either killed or inhibited and retarded.

In accordance with this invention, therefore, the chlorine-containing gas is liberated in nascent form in close proximity to the fruit to be treated (preferably within the storage or treating room itself). The reaction between sodium hypochlorite and hydrochloric acid, for instance, develops some heat and since aqueous solutions are employed, the reaction permits the liberation of hypochlorous acid gas and perhaps some hydrogen chloride in gaseous form. The conjoint action of these products of reaction produces a marked sterilizing effect. The liberation of liquefied chlorine in a storage room in approximately the same quantities will not exert the sterilizing effect which is attained in accordance with this invention.

The amount of the gas or vaporous products of reaction can be controlled very accurately by regulating the quantity of the reagents such as hypochlorite solution and acid solution, which are used. The attention of an expert chemist is not necessary. Sodium hypochlorite solutions can be purchased on the open market. Complicated machinery is not required. After the fruit is sterilized in accordance with this process, the residual chlorine-containing gas existing in the treating room can be exhausted from the room and pumped directly into a solution containing an alkali for the purpose of reforming, in part at least, additional quantities of hypochlorite solution. It is highly desirable that the chlorine-containing gas from the rooms be eliminated before operators enter the storage rooms. Suitable storage or treating rooms may be found in many packing houses although some provision may have to be made for rendering the rooms more gas-tight than those ordinarily encountered. The storage and temperature conditions found in usual fruit storage rooms are satisfactory.

Further exemplifying the process of this invention, it may be stated that when 200 cc. of a sodium hypochlorite solution containing 2.5% of available chlorine is used per 100 cubic feet of air space in the treating room and 50 cc. of a 1:1 hydrochloric acid is gradually added to the sodium hypochlorite solution, the gases generated or released will contain approximately 5 grams of chlorine and that under these conditions fruit will be sterilized against mold growth. If the fruit is subjected to these gaseous reaction products for a period of 2 to 6 hours, scale insects on the fruit will be killed in addition to the fungi. A concentration of approximately 0.05 gram released chlorine per cubic foot of gas or air in the treating room is sufficient to destroy the mold spores. Quantities of ingredients and the concentration of the gas may be varied, however, depending upon the time of contact and the temperature of the storage rooms. It has been found that the mold spores and scale insects on the trees can also be destroyed while the fruit is still on the trees by releasing the gaseous products of reaction under tents enclosing the trees.

What I claim:

1. A method of treating fruit and vegetables to substantially sterilize the same without injury, which comprises: gradually intermixing predetermined quantities of an acid and a solution containing a hypochlorite, and subjecting fruit and vegetables to vaporous products of reaction released by said intermixing and containing hypochlorous acid gas whereby mold decay is inhibited and the fruit virtually sterilized without injury to the fruit.

2. A method of treating whole fruit and vegetables to inhibit decay thereof, which comprises: gradually intermixing predetermined quantities of an acid and a solution containing a hypochlorite, and subjecting whole fruits and vegetables to the vaporous products of reaction containing hypochlorous acid gas released by said intermixing for a period of about 2 to 6 hours whereby mold decay is inhibited without injury to the fruit and vegetables.

3. A method of treating fruit and vegetables to inhibit decay thereof which comprises: subjecting fruit and vegetables to the vaporous products of reaction generated by the addition of a solution of an acid to an aqueous solution of an hypochlorite.

4. A method of treating fruit and vegetables to inhibit decay thereof which comprises: subjecting fruit and vegetables to the vaporous products of reaction generated by the addition of a solution of hydrochloric acid to an aqueous solution of alkali hypochlorite.

5. A method of treating fruit and vegetables to inhibit decay thereof which comprises: subjecting fruit and vegetables to the vaporous products of reaction generated by the addition of a solution of hydrochloric acid to an aqueous solution of alkali hypochlorite for a period of from about 2 to 6 hours at substantially normal temperature and humidity conditions.

6. A method of treating fruit and vegetables to substantially sterilize the same without injury, which comprises: gradually mixing hydrochloric acid and a solution containing a hypochlorite, and subjecting fruit and vegetables to vaporous products of reaction released by the said intermixing and containing hypochlorous acid, whereby mold decay is inhibited and the fruit virtually sterilized without injury to the fruit.

JATINDRA N. GUHA.